United States Patent
Savitski et al.

(10) Patent No.: US 11,135,778 B2
(45) Date of Patent: Oct. 5, 2021

(54) METHODS FOR DETERMINING A MELT LAYER THICKNESS ASSOCIATED WITH A PREDETERMINED WELD STRENGTH BASED ON A CORRELATION THEREBETWEEN

(71) Applicant: Dukane IAS, LLC, St. Charles, IL (US)

(72) Inventors: Alexander Savitski, Arlington Heights, IL (US); Leo Klinstein, Glenview, IL (US); Kenneth Andrew Holt, Batavia, IL (US); Hardik Shailesh Pathak, Addison, IL (US); Robert Edward Aldaz, St. Charles, IL (US)

(73) Assignee: Dukane IAS, LLC, St. Charles, IL (US)

( * ) Notice: Subject to any disclaimer, the term of this patent is extended or adjusted under 35 U.S.C. 154(b) by 165 days.

(21) Appl. No.: 16/440,371

(22) Filed: Jun. 13, 2019

(65) Prior Publication Data

US 2019/0381741 A1 Dec. 19, 2019

Related U.S. Application Data

(60) Provisional application No. 62/684,456, filed on Jun. 13, 2018.

(51) Int. Cl.
*B29C 65/08* (2006.01)
*B29C 65/00* (2006.01)

(52) U.S. Cl.
CPC .......... *B29C 65/08* (2013.01); *B29C 66/302* (2013.01); *B29C 66/73921* (2013.01); *B29C 66/9516* (2013.01)

(58) Field of Classification Search
CPC ... B29C 65/08; B29C 66/302; B29C 66/3022; B29C 66/30221; B29C 66/30223;
(Continued)

(56) References Cited

U.S. PATENT DOCUMENTS 3,850,776 A 11/1974 Karobath
5,730,832 A 3/1998 Sato
(Continued)

FOREIGN PATENT DOCUMENTS

CN 201064946 Y 5/2008
DE 3929710 A1 3/1991
(Continued)

OTHER PUBLICATIONS

International Search Report and Written Opinion of International Searching Authority for International Patent Application No. PCT/US2019/037082, dated Oct. 9, 2019 (10 pages).
(Continued)

*Primary Examiner* — George R Koch
(74) *Attorney, Agent, or Firm* — Nixon Peabody LLP

(57) ABSTRACT

A method for optimizing a welding process to produce a weld joint having a predetermined strength includes measuring a plurality of melt layer thicknesses of weld joints for a plurality of sample assemblies formed by the welding process, measuring a plurality failure loads of weld joints for the plurality of sample assemblies, each of the measured plurality of failures loads being associated with one of the measured plurality of melt layer thicknesses, selecting a first failure load from the plurality of measured failure loads responsive to determining that the first failure load corresponds to a predetermined weld strength, and selecting a first melt layer thickness from the plurality of measured melt layer thicknesses that is associated with the selected first measured failure load.

16 Claims, 14 Drawing Sheets
(5 of 14 Drawing Sheet(s) Filed in Color)

(58) Field of Classification Search
CPC ............ B29C 66/73921; B29C 66/951; B29C 66/9511; B29C 66/9512; B29C 66/9513; B29C 66/9514; B29C 66/9516; B29C 66/9517
See application file for complete search history.

(56) References Cited

U.S. PATENT DOCUMENTS

| | | | |
|---|---|---|---|
| 8,052,816 | B2 | 11/2011 | Klinstein |
| 8,360,300 | B1 | 1/2013 | Strotmann |
| 2006/0143642 | A1 | 6/2006 | Kawasaki |
| 2008/0210360 | A1 | 9/2008 | Soccard |
| 2010/0147466 | A1 | 6/2010 | Sans Marimon |
| 2011/0108181 | A1* | 5/2011 | Cai ............... B23K 20/10 156/64 |
| 2011/0174423 | A1 | 7/2011 | Touchet |
| 2012/0125521 | A1 | 5/2012 | Dersch |

FOREIGN PATENT DOCUMENTS

| | | |
|---|---|---|
| DE | 102010003268 A1 | 9/2011 |
| EP | 0168750 A1 | 1/1986 |
| EP | 0661208 A1 | 7/1995 |
| EP | 1072391 A2 | 1/2001 |
| EP | 2202117 A1 | 6/2010 |
| GB | 1047295 A | 11/1966 |
| JP | 59016495 A | 1/1984 |
| WO | WO 2006/128246 A1 | 12/2006 |
| WO | WO 2013/053588 A1 | 4/2013 |

OTHER PUBLICATIONS

W. Michaeli et al.; "Investigations into the residual melt coat thickness as a new characteristic for process optimisation in the case of ultrasonic welding"; Joining Plastics—Fugen von Kunststoffen, Dec. 31, 2009, pp. 235-245; XP055626989; ISSN: 1864-3450 (11 pages).

Sancaktare et al. :"Effects of Calcium Carbonate, Talc, Mica, and Glass-Fiber Fillers on the Ultrasonic Weld Strength of Polyproylene"; Journal of Applied Polymer Science, vol. 94, pp. 1986-1998; John Wiley & Sons, Inc.; Jan. 1, 2004; XP007901707; ISSN: 0021-8995 (13 pages).

Kagan, V. et al.; "Laser Transmission Welding of Semicrystalline Thermoplastics—Part II: Analysis of Mechanical Performance of Welded Nylon"; Journal of Reinforced Plastics and Composites, vol. 23, No. 1, pp. 95-107; Technomic Publishing, US; Jan. 1, 2004; XP007901633; ISSN: 0731-6844 (15 pages).

International Search Report, PCT/US2014/58027, 4 pages, dated Feb. 10, 2015.

International Written Opinion, PCT/US2014/58027, 5 pages, dated Feb. 10, 2015.

European Patent Office, Extended European Search Report for Application No. EP 14861847.3, dated Jun. 19, 2017 (13 pages).

Volkov, S. S.; "Effect of dimensions of the gap between the edges on the strength of ultrasound welded joints in rigid plastics"; Welding Intl., vol. 17, No. 6, pp. 482-486; Taylor & Francis, Abingdon, UK; Jan. 1, 2003; XP001167971; ISSN: 0950-7116 (5 pages).

* cited by examiner

METHODS FOR DETERMINING A MELT LAYER THICKNESS ASSOCIATED WITH A PREDETERMINED WELD STRENGTH BASED ON A CORRELATION THEREBETWEEN

CROSS-REFERENCE TO RELATED APPLICATIONS

This application claims the benefit of and priority to U.S. Provisional Application No. 62/684,456, filed on Jun. 13, 2018, which is hereby incorporated by reference herein in its entirety.

TECHNICAL FIELD

The present disclosure relates generally to welding processes, and more particularly, to methods for optimizing one or more welding process settings for a welding process.

BACKGROUND

Ultrasonic welding of thermoplastics is widely used in many industries to weld together two parts to form an assembly in a short time without introducing additional consumables such as fasteners, adhesives, or solvents. The ultrasonic welding process is fast, economical and easily automated, and is commonly controlled by time, energy, or weld distance to achieve welds of predicted quality. However, given real-life variations in part dimensions, as well as the limited ability to control the rate of molten material displacement with pneumatically driven ultrasonic welders, none of these control modes can assure the consistency of the weld. The present disclosure is directed to solving these and other problems.

SUMMARY

According to some implementations of the present disclosure, a method for optimizing a welding process to produce a weld joint having a predetermined strength includes measuring a plurality of melt layer thicknesses of weld joints for a plurality of sample assemblies formed by the welding process, measuring a plurality of failure loads of weld joints for the plurality of sample assemblies, each of the measured plurality of failures loads being associated with one of the measured plurality of melt layer thicknesses, selecting a first failure load from the plurality of measured failure loads responsive to determining that the first failure load corresponds to a predetermined weld strength, and selecting a first melt layer thickness from the plurality of measured melt layer thicknesses that is associated with the selected first measured failure load.

According to some implementations of the present disclosure, a method for producing welds having a predetermined weld strength includes forming a first plurality of sample assemblies using a first value of a first weld process setting, forming a second plurality of sample assemblies using a second value of the first weld process setting value, the second value being different than the first value, measuring a first melt layer thickness of a weld joint of at least one the first plurality of sample assemblies and a second melt layer thickness of a weld joint of at least one of the second plurality of sample assemblies, measuring a first failure load of at least one the first plurality of sample assemblies and a second failure load of at least one of the second plurality of sample assemblies, and responsive to determining that the first failure load corresponds to a predetermined weld strength, forming a production assembly including a weld joint having a melt layer thickness that is substantially the same as the first melt layer thickness.

The above summary is not intended to represent each embodiment or every aspect of the present invention. Additional features and benefits of the present invention are apparent from the detailed description and figures set forth below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1C:
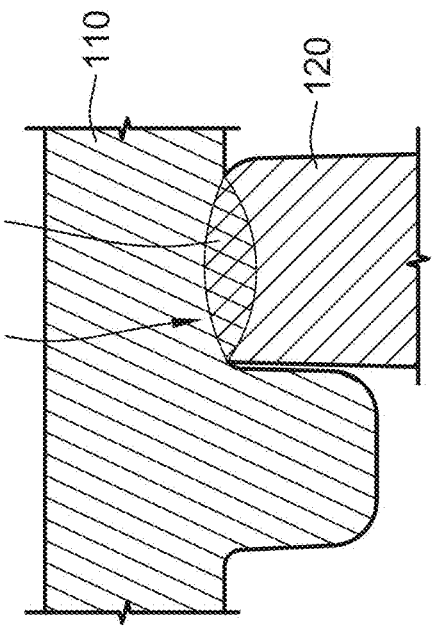
FIG. 1C is a partial cross-sectional view of the exemplary set of parts of FIG. 1 subsequent to the welding process according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Figure 1A:
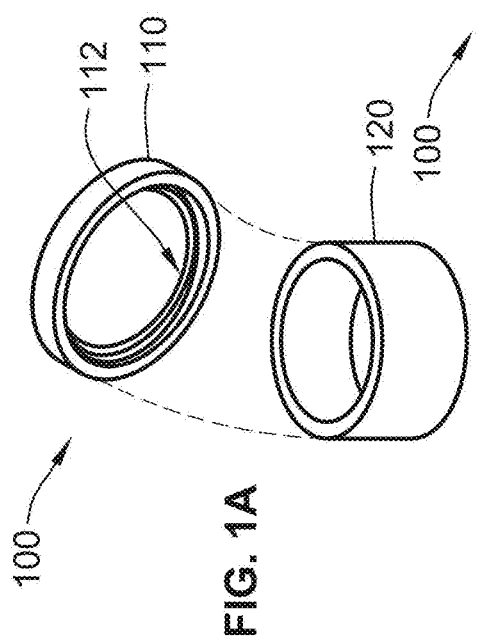
FIG. 1A is a perspective view of an exemplary set of parts to welded according to some implementations of the present disclosure.
Figure 1B:
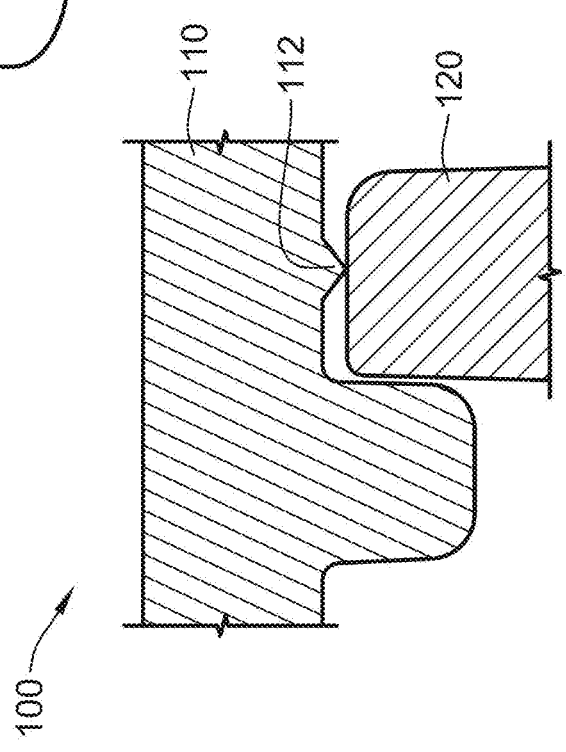
FIG. 1B is a partial cross-sectional view of the exemplary set of parts of FIG. 1 prior to a welding process according to some implementations of the present disclosure.

Referring generally to FIGS. 1A-1C, an exemplary assembly 100 includes a first part 110 and a second part 120 to be welded together using a welding process. The first part 110 includes an energy director 112 (FIGS. 1B and 1C) configured to aid in welding the first part 110 to the second part 120. As shown in FIG. 1B, prior to welding, the first part 110 and the second part 120 are placed against each other such that the energy director 112 abuts an upper surface of the second part 120. The welding process imparts energy (e.g., heat energy, vibration energy, or electromagnetic energy) and pressure (e.g., by clamping the first part 110 and the second part 120 together) to the first part 110 and the second part 120 such that the two parts are welded together. The energy director 112 is fully consumed, or melted, during the welding process. The welding process used to weld or join the first part 110 and the second part 120 can be, for example, a servo-controlled ultrasonic welding process, a pneumatic-controlled ultrasonic welding process, a laser welding process, or a hot plate or hot bar welding process.

As shown in FIG. 1C, the welding process forms a weld joint 130 between the first part 110 and the second part 120. The weld joint 130 has a melt layer thickness 132 where a portion of the first part 110 and a portion of the second part 120 melt during the welding process due to the imparted energy. As discussed in further detail herein, the melt layer thickness 132 can be accurately controlled by adjusting one or more weld process parameters (e.g., a weld velocity, a dynamic hold velocity, a dynamic hold distance, an amplitude, a trigger force, a melt-detect percentage, a static hold time, or any combination thereof). As also discussed in further detail herein, the melt layer thickness 132 is closely correlated to a strength of the weld joint 130.

While the first part 110 and the second part 120 are shown in FIGS. 1A-1C as having a generally circular shape, more generally, the first part 110 and the second part 120 can have any suitable shape (e.g., triangular, rectangular, square, polygonal etc.) Moreover, the first part 110 and the second part 120 can be the same or different shapes or sizes. The first part 110 and the second part 120 can comprise any suitable material for welding (e.g., a thermoplastic material).

Figure 2A:
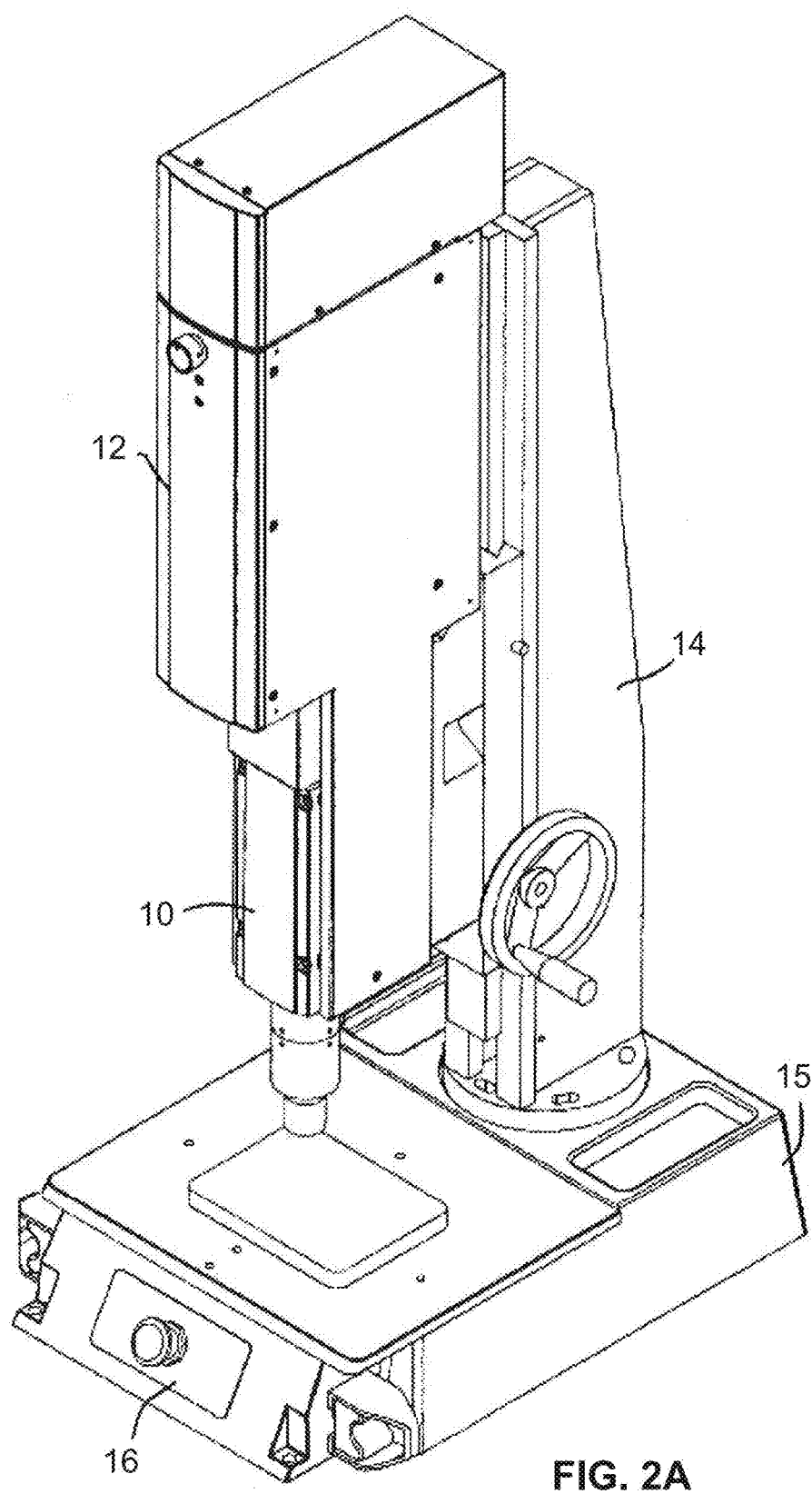
FIG. 2A is a perspective view of an ultrasonic welding machine according to some implementations of the present disclosure.
Figure 2B:
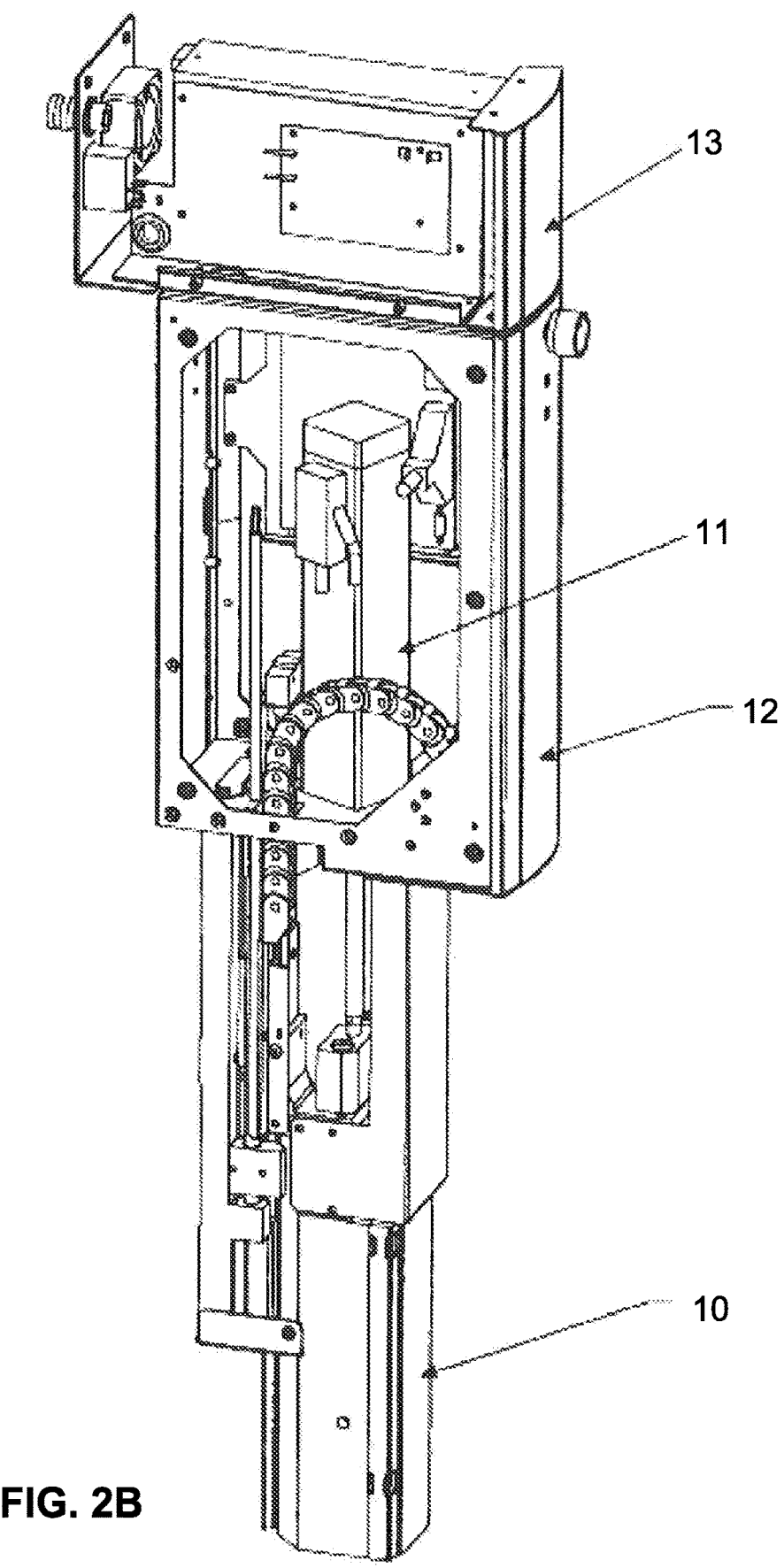
FIG. 2B is a partial side perspective view of the ultrasonic welding machine of FIG. 1A with portions of the housing walls broken away to reveal the internal structure according to some implementations of the present disclosure.
Figure 2C:
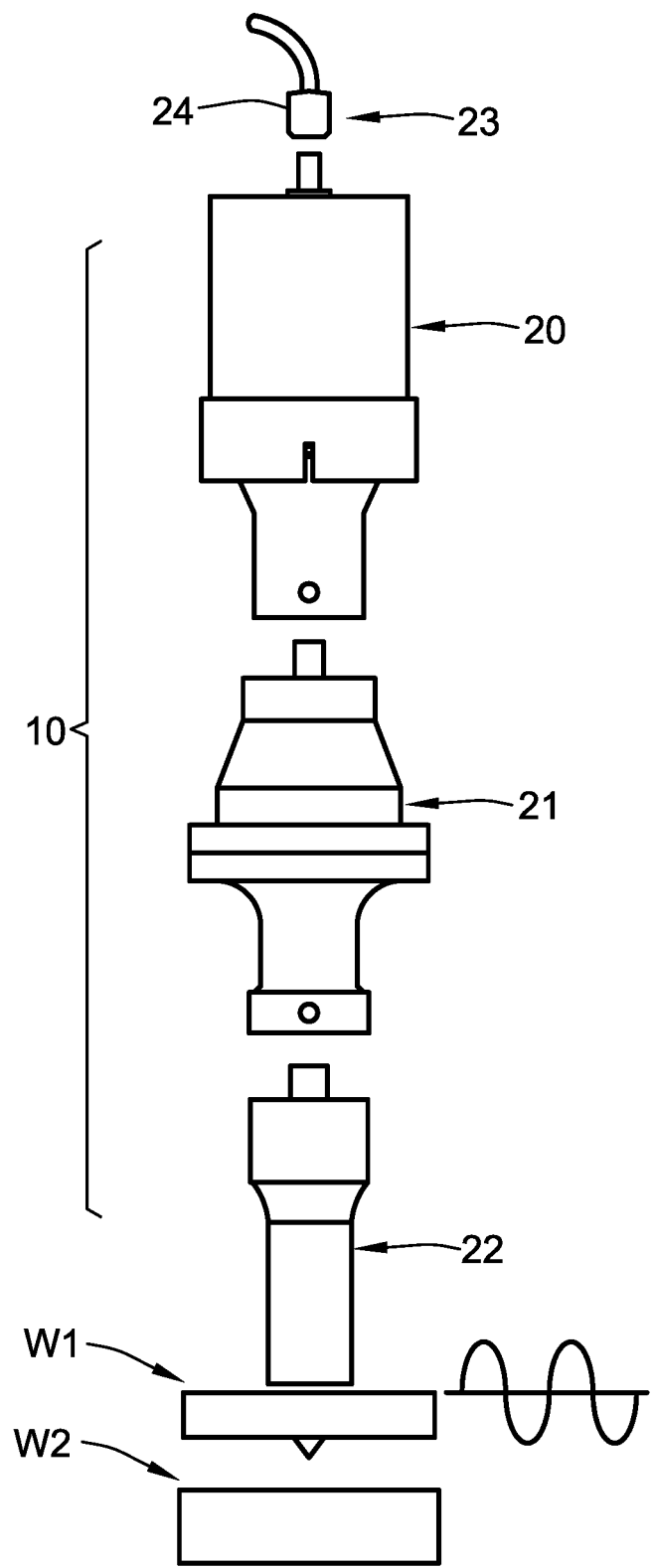
FIG. 2C is a partial, exploded elevation weld of an ultrasonic weld stack of the ultrasonic welding machine of FIG. 2A according to some implementations of the present disclosure.

Referring to FIGS. 2A-2C, an illustrative ultrasonic welding machine is described, which can be used for the various implementations of the present disclosure (e.g., to form the assembly 100 as shown in FIG. 1C). For example, this illustrative ultrasonic welding machine can include an ultrasonic welding stack 10 that is mounted for controlled vertical movement by a bidirectional, electrically powered linear actuator 11 (FIG. 2B). The stack 10 will be described in more detail below in connection with FIG. 2C. The actuator 11 can be mounted within a main housing 12, which also supports an auxiliary housing 13 that contains the power supply and electronic controls for the welding press. In a variation of this concept, the housing 12 and auxiliary housing 13 can be combined into one structure. The workpieces W1 and W2 (FIG. 2C) to be welded can be mounted in a stationary fixture below the ultrasonic stack 10, and the actuator 11 can advance the stack 10 downwardly against the upper workpiece W1. The lower end of the stack 10 is pressed downwardly against the workpiece W1 to press the upper workpiece W1 against the lower workpiece W2 while applying mechanical vibrations to the workpiece W1 to effect the desired welding that joins the two workpieces W1 and W2 together.

The main housing 12 is mounted on a frame that includes a vertical column 14 extending upwardly from a base 15 that carries a fixture for receiving and supporting the workpieces to be welded. The housing 12 is typically adjustably mounted on the column 14 to allow the vertical position of the entire housing 12 to be adjusted for different workpieces. A control panel 16 is provided on the front of the base 15.

The ultrasonic welding stack 10 (see FIG. 2C) includes an electromechanical transducer 20 which converts electrical energy into mechanical vibrations, a booster 21 to alter the gain (i.e., the output amplitude) of the mechanical vibrations produced by the transducer 20, and a horn 22 to transfer the mechanical vibrations from the booster 21 to the parts to be welded. As shown in FIG. 2C, the transducer 20 can include a connector 23 for attaching a high voltage coaxial cable 24 that delivers a high-frequency electrical signal for exciting the transducer 20. This signal can be supplied by a separate ultrasonic signal generator (not shown). An alternative method of connection can also be utilized to permit easier removal and installation of the transducer. The transducer 20 can generate the ultrasonic vibrations as a Langevin piezoelectric converter that transforms electrical energy into mechanical movement. Power applied to the transducer 20 can range from less than 50 Watts up to 5000 Watts at a typical frequency of 20 kHz.

The transducer 20 can be made from a number of standard piezoelectric ceramic elements separated by thin metal plates, clamped together under high pressure. When an alternating voltage is applied to the ceramic elements, a corresponding electric field is produced which results in a variation in thickness of the ceramic elements. This variation in thickness induces a pressure wave that propagates through the material and is reflected by the ends of the metal mass of the transducer. When the length of the assembly is tuned to its frequency of excitation, the assembly resonates and becomes a source of standing waves. The output amplitude from a 20-kHz transducer is typically about 20 microns (0.0008 inches). This amplitude needs to be amplified by the booster 21 and the horn 22 to do useful work on the parts W1 and W2. The booster and horn act as an acoustic waveguide or transformer to amplify and focus the ultrasonic vibrations to the work piece.

The primary function of the booster 21 is to alter the gain (i.e., output amplitude) of the stack 10. A booster is amplifying if its gain is greater than one and reducing if its gain is less than one. Gains at 20-kHz typically range from less than one-half to about three. The horn 22 cannot normally be clamped because it must be free to vibrate and thus only the transducer 20 and the booster 21 are secured. Thus, a secondary function (and sometimes the sole purpose) of the booster 21 is to provide an additional mounting location without altering the amplification of the stack when secured in a press. The neutral or coupling booster is added between the transducer and horn and mounted in the press by a mounting ring which is placed at the nodal point (where the standing wave has minimal longitudinal amplitude).

The horn 22 has three primary functions. First, the horn 22 transfers the ultrasonic mechanical vibrational energy (originating at the transducer 20) to the thermoplastic work piece (W1 and W2) through direct physical contact, and localizes the energy in the area where the melt is to occur. Second, the horn 22 amplifies the vibrational amplitude to provide the desired tip amplitude for the thermoplastic workpiece and welding process requirements. Third, the horn 22 applies the pressure necessary to force the weld when the joint surfaces are melted.

The horn is precision machined and is typically designed to vibrate at either 15 kHz, 20 kHz, 30 kHz, 40 kHz, 50 kHz or 70 kHz. The higher the frequency, the shorter the acoustic wavelength, and consequently the smaller the horn. The tuning of a horn is typically accomplished using electronic frequency measurement. Horns are usually manufactured from high-strength aluminum alloys or titanium, both of which have excellent acoustical properties to transmit the ultrasonic energy with little attenuation.

There are many different horn shapes and styles depending on the process requirements. Factors which influence the horn design are the materials to be welded and the method of assembly. The horn must amplify the mechanical vibration so that the amplitude is sufficient to melt the thermoplastic workpieces at their interface, and the gain of the horn is determined by its profile. The amplitude at the tip of the horn typically ranges from 30 to 125 microns peak to peak (1.2 to 5.0 thousandths of an inch) at 20 kHz. In an alternate variation, the horn can be designed so that it takes the form of a booster and combines the functions of stabilization and welding. In this variation, the booster is eliminated and the horn is secured in the press in the position of the booster mounting ring area. As the frequency increases, the vibration amplitude decreases. Higher frequencies are used for seaming of thin materials and delicate parts that do not require a lot of amplitude. Since the horn becomes smaller at higher frequencies, closer spacing can also be achieved.

Plastic welding is the most common application of ultrasonic assembly. To perform ultrasonic plastic welding, the tip of the horn is brought into contact with the upper workpiece W1, as shown in FIG. 2C. Pressure is applied and ultrasonic energy travels through the upper workpiece, increasing the kinetic energy (or heat) at the contact point of the two workpieces. The heat melts a molded ridge of plastic on one of the workpieces, and the molten material flows between the two surfaces. When the vibration stops, the material solidifies forming a permanent bond.

Although an illustrative ultrasonic weld is discussed above for purposes of the present application, any ultrasound weld can be used for the systems and methods of the present disclosure. Additional discussions of the physical components and control systems of weld processes can be found, for example, in Klinstein, et al. (U.S. Pat. No. 8,052,816 B 1).

Generally, the most reliable control mode for the ultrasonic weld process is the "weld by distance" option, which is available with most computer-controlled welding equipment. Normally, weld distance is monitored by an encoder and controlled by the processor that determines the movement of the stack. For weld joint designs using an energy director style interface, the optimum weld distance for strength and repeatability of the weld is typically set at a value based on the size and height of the energy director. However, this setting may not guarantee that the weld will be strong and free of excessive flash. For instance, if an energy director (e.g., the energy director 112 in FIGS. 1A-1C) is not melted, but rather partially deformed during the weld process, the deformation will be interpreted by the welding process controller as part of the weld distance, even though the movement occurred without melting. The result of this is a "cold weld," during which there is more physical deformation than actual melting of the energy director. Possible reasons for "cold weld" formation include energy director molding inconsistencies, excessive trigger force, part misalignment, incorrect frequency selection, inadequate amplitude and many others. Well-qualified weld processes, utilizing appropriate limits on key process parameters, will catch some of these poorly formed welds. However, data from the welder will often not show this lack of weld, as the energy level, weld time and power level recorded by the process controller may not differ greatly than the same values associated with a good weld.

Alternatively, reaching the programmed weld depth can also result in excessive flash, which is undesirable. Excessive flash formation can occur when the energy director is shorter than expected, as would occur in a part with inadequately filled energy director details (resulting from molding short shots), or with an energy director that has been damaged in handling. In this case the part is collapsed beyond the energy director creating an unintended melt, which results in excessive flash around the joint area. Some of these welds can be identified as a suspect by closely monitoring weld energy set as a secondary weld control. This approach has varying levels of success and is notably dependent on the specific weld setup.

Consistent (e.g., repeatable) welds with high weld joint strength are desirable. In some cases, it is desirable for the weld joint strength to be the same as or greater than the parent material strength. In other words, the weld joint is stronger than the constituent material of the parts that are assembled together. To achieve high-strength weld joints, an operator of the welding system (e.g., the machine in FIGS. 2A-2C) needs to adjust one or more weld process settings. Some methods for optimizing these weld process settings for increased weld strength include destructive testing, such as tensile, bending, pressure testing, and others, adjusting one or more process settings based on the test results, and then repeating the process. Such methods for achieving a desired weld strength are time consuming and inefficient because many sample parts must be made and destructively tested.

In ultrasonic welding applications (e.g., ultrasonic servo-driven welding processes), some of the weld process settings (e.g., weld velocity) can be adjusted to accurately control a melt lack thickness. For example, unlike pneumatic-controlled welding systems, a servo-controller welding system (e.g., that is the same as, or similar to, the welding system shown in FIGS. 2A-2C) can be programmed to assure that an initial melt layer thickness exists prior to starting the downward movement of the press. That is, the press can be held in position upon initiation of welding until a decrease in force is detected. This prevents the deformation of the energy director prior to the application of the weld force from counting towards the weld distance. When the force drop reaches a predetermined value (e.g., programmed as a melt-percentage), this is indicative of the presence of an initial molten layer. Thereafter, downward movement of the press continues.

Additionally, servo-controller ultrasonic welding systems allow the operator to control the propagation of the melt layer during the weld cycle, by precisely varying the velocity of molten material displacement throughout the process, for example. Other weld process settings can be adjusted during the "hold phase" to directly control the flow squeeze rate of the molten material, and thus the thickness of the melt layer. For example, a dynamic hold feature allows controlling of the squeeze flow rate of molten material and the collapse distance after ultrasonic vibration has ceased. This allows for precise control of the material displacement during recrystallization and solidification at the end of the weld. In other words, the thickness of the melt layer can be accurately predicted based on the values of one or more weld process settings. Accordingly, it would be advantageous to establish a relationship between the melt layer thickness and the weld strength so that the weld strength of a given weld can be predicted based on the predicted melt layer thickness.

Figure 3:
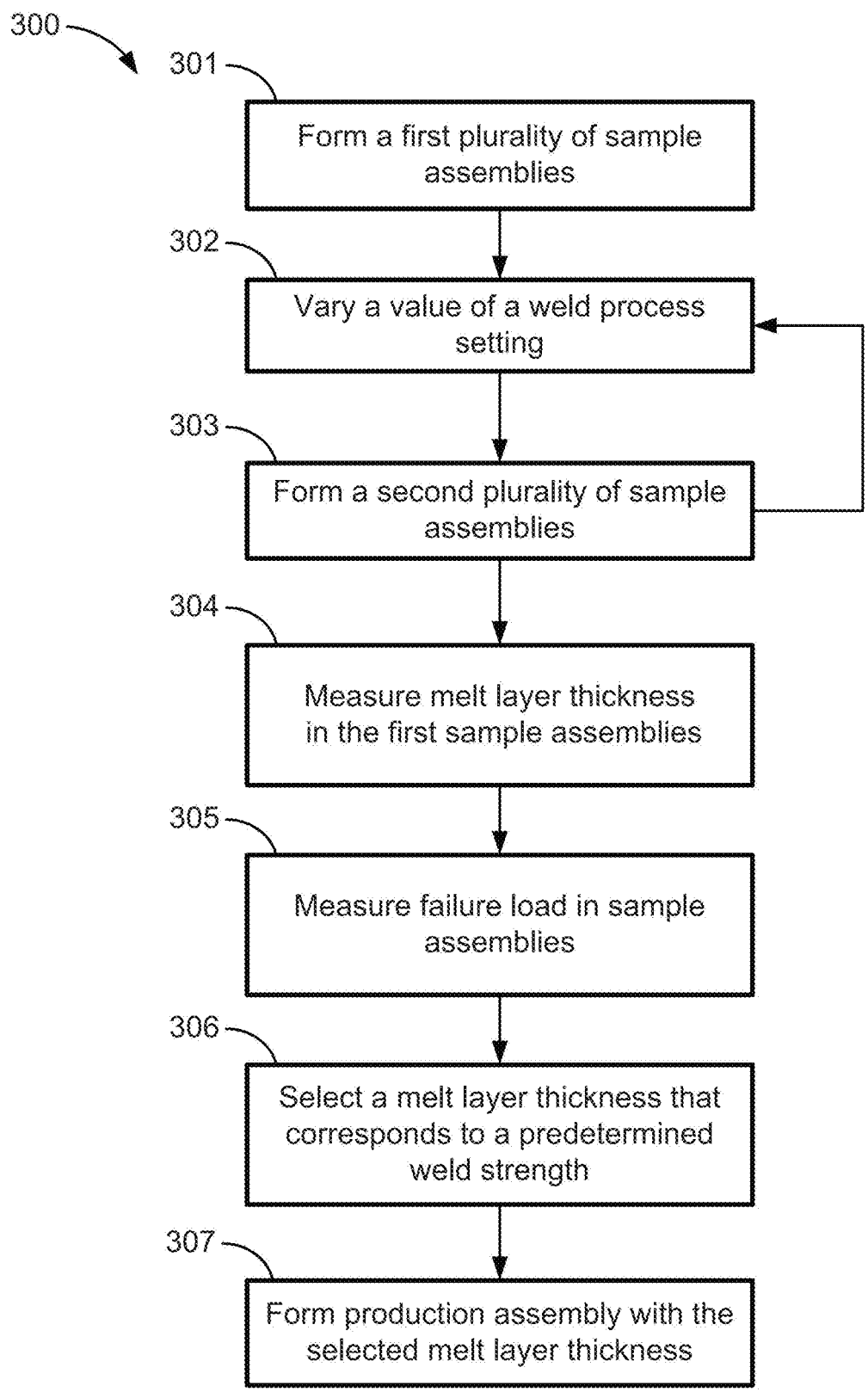
FIG. 3 is a process flow diagram for a method for producing a weld joint having a predetermined weld strength according to some implementations of the present disclosure.

Referring to FIG. 3, a method 300 for optimizing a welding process to produce weld joints having a predetermined (e.g., sufficient) weld strength is illustrated. The inventors have discovered that there is a close correlation between the melt layer thickness of the weld joint and the failure load, or strength, of the weld joint. For example, an increased melt layer thickness of the weld joint can correspond to an increase in the failure load (strength) of the weld joint. Because one or more weld process settings can be adjusted to accurately control the melt layer thickness, it is advantageous to correlate a desired strength of the weld joint (e.g., that is equal or very close to the parent material strength) with a melt layer thickness, and in turn form production assemblies (e.g., for mass production) with high strength weld joints by adjusting the weld process settings that control melt layer thickness.

Step 301 of the method 300 includes forming a first plurality of sample assemblies (e.g., that are the same as, or similar to, the assembly 100 of FIG. 1C) by welding parts together (e.g., parts that are the same as, or similar to, the first part 110 and/or the second part 120 of FIG. 1C) using a welding process (e.g., a servo-controller ultrasonic welding process that uses an ultrasonic welding machine that is the same as, or similar to, the machine of FIGS. 2A-2C). Sample assemblies are used for testing (e.g., destructive testing) and are not mass produced for sale to consumers. The first plurality of sample assemblies can include any suitable number of sample assemblies (e.g., two, ten, fifteen, fifty, one-hundred, etc.)

In one non-limiting, exemplary implementation of step 301, a first plurality of sample assemblies can be formed using the weld process settings shown below in Table 1. More generally, any suitable ultrasonic amplitude value, trigger force value, melt-detect percentage value, weld distance value, weld velocity value, static hold value, or any combination thereof can be used for the welding process to form the first plurality of sample assemblies during step 301. The weld velocity value can be a constant weld velocity (e.g., about 0.5 mm/s, about 1.0 mm/s, about 1.5 mm/s, etc.) or a linearly profiled weld velocity (e.g., linearly increasing from 0.25 mm/s to 0.40 mm/s, linearly decreasing from 0.40 mm/s to 0.25 mm/s, etc.).

TABLE 1

| Amplitude (μm) | Trigger Force (N) | Melt-Detect (%) | Distance (mm) | Weld Velocity (mm/s) | Static Hold (sec) |
| --- | --- | --- | --- | --- | --- |
| 28 | 400 | 5 | 0.245 | 0.25-0.40 | 0.5 |

Step 302 of the method 300 includes varying the value of a first weld process setting subsequent to forming the first plurality of sample assemblies during step 301. The varied weld process setting can be, for example, the weld velocity, a dynamic hold distance, or a dynamic hold velocity. In one non-limiting, exemplary implementation of step 302, the value of the weld velocity is varied. For example, if the weld velocity has a linearly increasing profile between 0.25 mm/s and 0.40 mm/s during step 301, the weld velocity can be varied to a weld velocity with a linearly decreasing profile between 0.40 mm/s and 0.25 mm/s during step 302. During step 302, the other weld process settings (e.g., ultrasonic amplitude, trigger force, melt-detect percentage, weld distance, static hold time, dynamic hold distance, dynamic hold velocity, etc.) of the weld process are held constant (i.e., are not varied).

Step 303 includes forming a second plurality of sample assemblies according to the weld process using the varied first weld process setting from step 302. In other words, the first weld process setting has a first value when the first plurality of sample assemblies is formed during step 301, and a second value that is different than the first value when the second plurality of sample assemblies are formed during step 303. The second plurality of sample assemblies formed in step 303 can include the same number of assemblies as the first plurality of sample assemblies formed during step 301, or a different number of sample assemblies. However, the first plurality of sample assemblies and the second plurality of sample assemblies are the same assembly (e.g., both include the same first part 110 and second part 120 of FIG. 1C).

As shown in FIG. 3, step 302 and step 303 can be repeated one or more times to vary the weld process setting a plurality of times (e.g., two times, six times, ten times, . . . n times), thereby forming a plurality of sample assemblies for each variation of the weld process setting. For example, in one non-limiting, exemplary implementation of the method 300, steps 302 and 303 are repeated three times such that five different pluralities of sample assemblies are formed.

Step 304 of the method 300 includes measuring a melt layer thickness of a weld joint in each of the plurality of sample assemblies formed during step 301 and step 303. Specifically, step 304 includes cross-sectioning at least one of the first plurality of sample assemblies formed during step 301 and cross-sectioning at least one of the second plurality of sample assemblies formed during step 303. These cross-sections can then be polished and examined (e.g., by a human user) under a microscope to measure the melt layer thickness of the weld joint.

In some implementations, step 304 includes averaging the measured melt layer thickness across two or more sample assemblies in one or both of the first plurality of sample assemblies from step 301 and the second plurality of sample assemblies from step 303. For example, if the first plurality of sample assemblies formed during step 301 and the second plurality of sample assemblies formed during step 303 each include ten sample assemblies, step 304 can include cross-sectioning five sample assemblies from each group and averaging the measured melt layer thickness. Averaging the measured melt layer thickness can aid in providing more accurate results and account for uncontrollable variations in the welding process and/or the sample assemblies.

Figure 4:
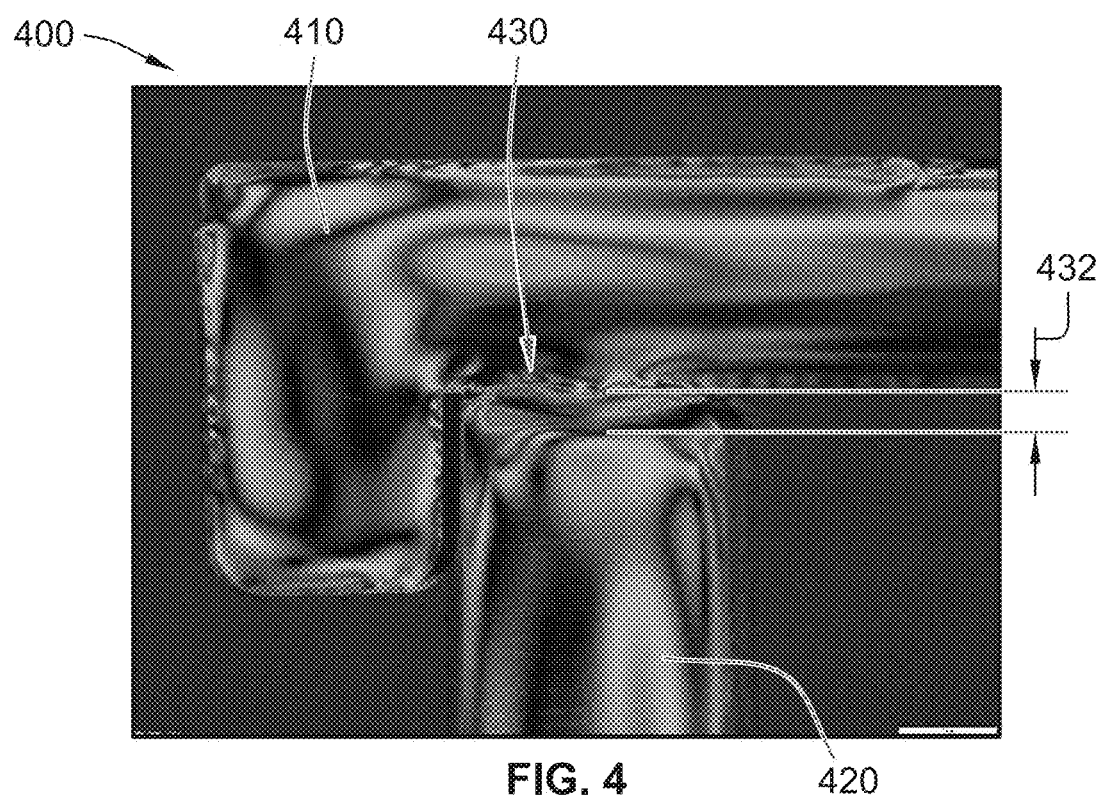
FIG. 4 is an exemplary cross-sectional image of a first weld joint of a first sample assembly according to some implementations of the present disclosure.

Referring generally to FIGS. 4-8, in some implementations of the method 300, steps 302-303 are repeated three times such that five different pluralities of sample assemblies are formed with the varied first weld process setting. In the non-limiting examples of FIGS. 4-8, the weld velocity is varied. Referring to FIG. 4, an exemplary cross-sectioned sample assembly 400 including a first part 410, a second part 420, and a weld joint 430 is shown. The weld joint 430 has a melt layer thickness 432 that can be measured by examining the cross-sectioned sample assembly 400 (e.g., under a microscope). In this example, the sample assembly 400 is one of a first plurality of sample assemblies that were formed according to the welding process with a weld speed of about 1.5 mm/s (e.g., during step 301) and the measured melt layer thickness 432 is about 289 microns.

Figure 5:
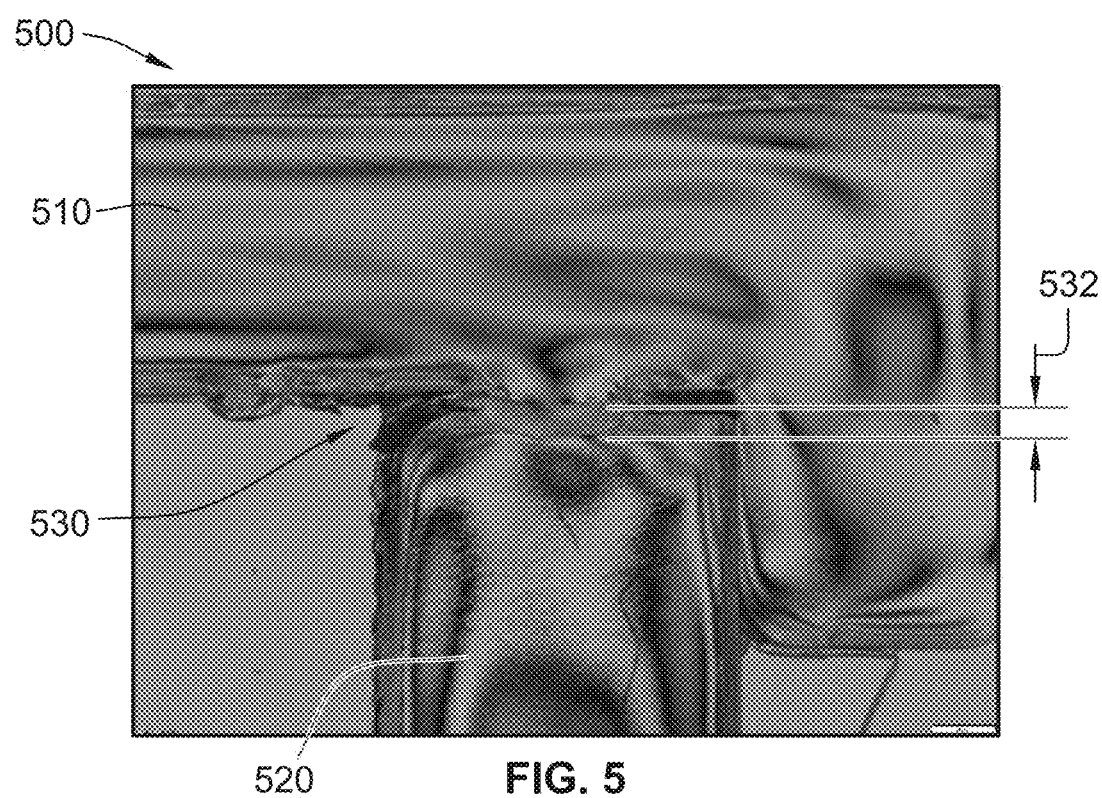
FIG. 5 is an exemplary cross-sectional image of a second weld joint of a second sample assembly according to some implementations of the present disclosure.

Referring to FIG. 5 an exemplary cross-sectioned sample assembly 500 including a first part 510, a second part 520, and a weld joint 530 is shown. The weld joint 530 has a melt layer thickness 532 that can be measured by examining the cross-sectioned sample assembly 500. In this example, the sample assembly 500 is one of a second plurality of sample assemblies that were formed according to the welding process with a weld speed of about 1.0 mm/s (e.g., during step 303) and the measured melt layer thickness 532 is about 356 microns.

Figure 6:
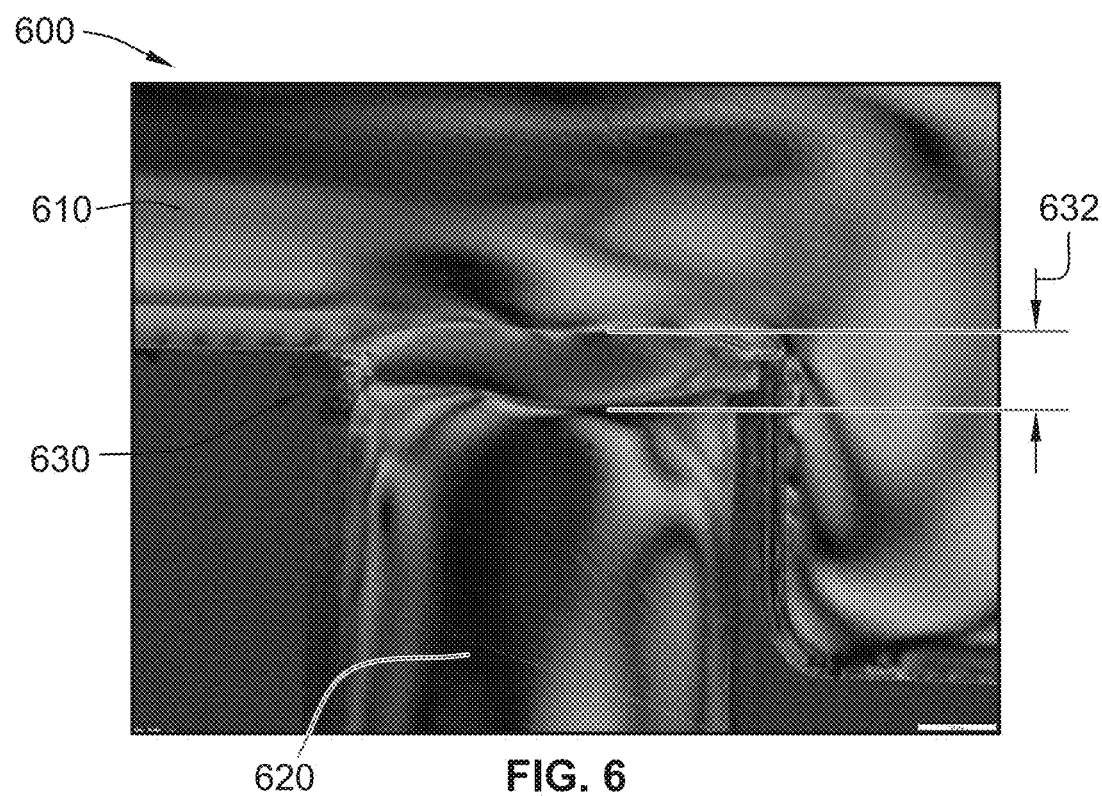
FIG. 6 is an exemplary cross-sectional image of a third weld joint of a third sample assembly according to some implementations of the present disclosure.

Referring to FIG. 6 an exemplary cross-sectioned sample assembly 600 including a first part 610, a second part 620, and a weld joint 630 is shown. The weld joint 630 has a melt layer thickness 632 that can be measured by examining the cross-sectioned sample assembly 600. In this example, the sample assembly 600 is one of a third plurality of sample assemblies that were formed according to the welding process with a weld speed of about 0.5 mm/s (e.g., when step 303 is repeated a first time) and the measured melt layer thickness 632 is about 469 microns.

Figure 7:
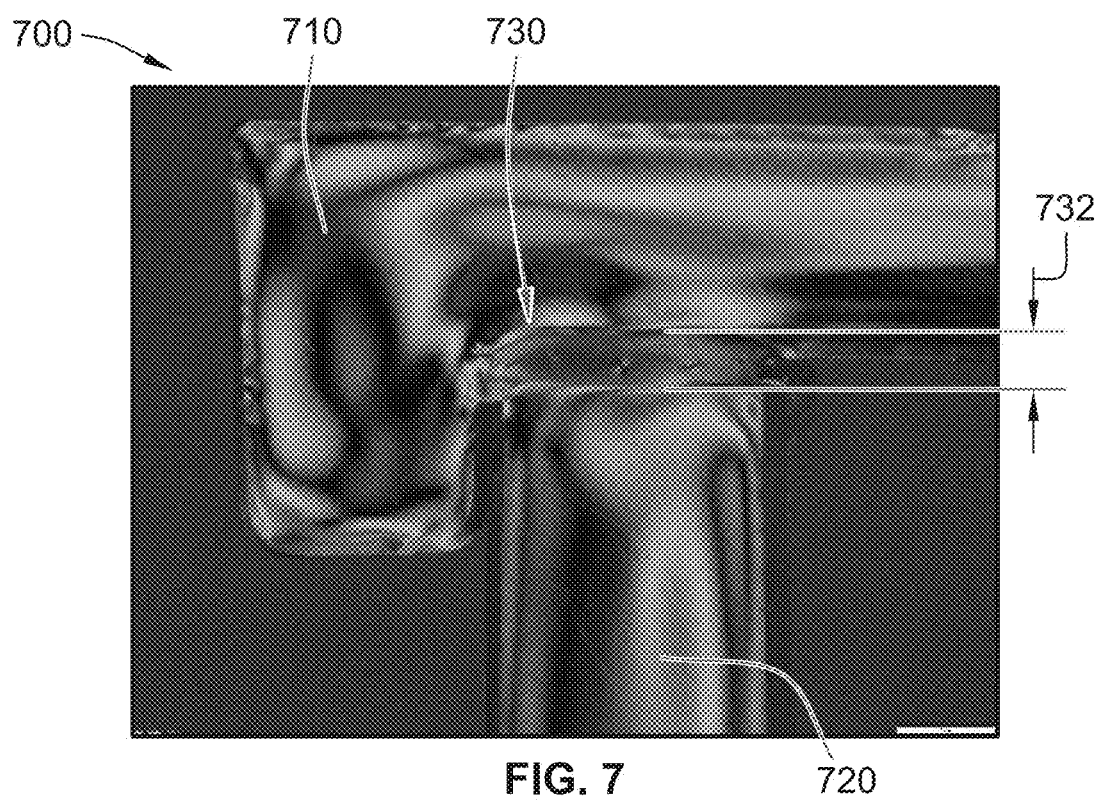
FIG. 7 is an exemplary cross-sectional image of a fourth weld joint of a fourth sample assembly according to some implementations of the present disclosure.

Referring to FIG. 7 an exemplary cross-sectioned sample assembly 700 including a first part 710, a second part 720, and a weld joint 730 is shown. The weld joint 730 has a melt layer thickness 732 that can be measured by examining the cross-sectioned sample assembly 700. In this example, the sample assembly 700 is one of a fourth plurality of sample assemblies that were formed according to the welding process with a weld speed having a linearly decreasing profile between 0.4 mm/s and 0.25 mm/s (e.g., when step 303 is repeated a second time) and the measured melt layer thickness 732 is about 535 microns.

Figure 8:
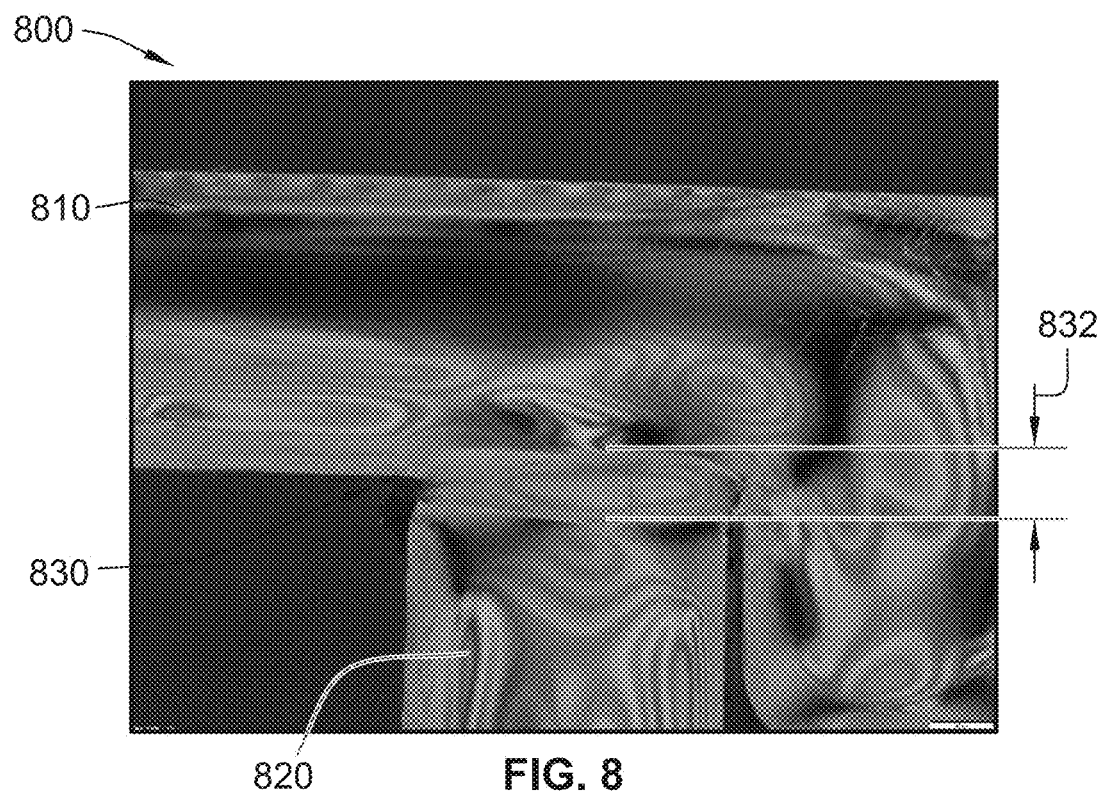
FIG. 8 is an exemplary cross-sectional image of a fifth weld joint of a fifth sample assembly according to some implementations of the present disclosure.

Referring to FIG. 8 an exemplary cross-sectioned sample assembly 800 including a first part 810, a second part 820, and a weld joint 830 is shown. The weld joint 830 has a melt layer thickness 832 that can be measured by examining the cross-sectioned sample assembly 800. In this example, the sample assembly 800 is one of a fifth plurality of sample assemblies that were formed according to the welding process with a weld speed having a linearly increasing profile between 0.425 mm/s and 0.4 mm/s (e.g., when step 303 is repeated a third time) and the measured melt layer thickness 732 is about 561 microns.

Referring back to FIG. 3, step 305 of the method 300 includes measuring a failure load in the first plurality of sample assemblies from step 301 and the second plurality of sample assemblies from step 303 (and any additional pluralities of sample assemblies formed when step 302 and step 303 are repeated one or more times). The failure load is the load (e.g., applied forced) at which a sample assembly fails (e.g., fractures) under stress (e.g., tensile stress). Thus, the failure load is indicative of the tensile strength of the sample assembly. In some implementations, step 305 includes applying a tensile strength to the sample assemblies (e.g., using a pull test fixtures). Further, in some implementations, step 305 includes determining an average and/or standard deviation for the measured failure load across multiple ones of each of the plurality of sample assemblies being tested (e.g., averaging the failure load for fifteen sample assemblies in each plurality of sample assemblies).

Referring back to the example implementation of step 304 illustrated in FIGS. 4-8, sample assemblies in each of the plurality of sample assemblies were subjected to a tensile test to determine the failure load. Specifically, fifteen samples from each of the plurality of sample assemblies were subjected to the tensile test. Table 2 (below) summarizes the relationship between weld velocity, melt layer thickness, and failure load.

TABLE 2

| Weld Speed | Average Failure Load | Melt Layer Thickness | Failure Load Standard Deviation | |
|---|---|---|---|---|
| (mm/s) | (N) | (μm) | (N) | (%) |
| 1.5 | 1547 | 289 | 176 | 11.4 |
| 1.0 | 2020 | 356 | 310 | 15.4 |
| 0.5 | 2730 | 469 | 706 | 25.9 |
| 0.4-0.25 | 3619 | 535 | 882 | 24.4 |
| 0.25-0.4 | 3997 | 561 | 763 | 19.1 |

Step 306 of the method 300 includes selecting one melt layer thickness from the plurality of measured melt layer thicknesses (step 304) that corresponds to a predetermined weld strength. As discussed herein, the inventors have discovered that the melt layer thickness of a weld joint closely correlates to the strength of the weld joint. Each of the plurality of sample assemblies are associated with (1) a measured melt layer thickness (step 304) and (2) an average failure load (step 305). As discussed herein, the average failure load is indicative of the strength of the weld joint. If the average failure load is equal to a parent material strength of the parts comprising the sample assemblies (e.g., the first part 110 and/or the second part), this means that the strength of the weld joint is at least as strong as the parent material strength. A weld joint strength that is at least as strong as the parent material strength is desirable in welding applications. Thus, by examining the measured average failure loads (from step 305) and determining which measured average failure load(s) correspond to a predetermined weld strength (e.g., that is equal to or greater than the parent material strength), an associated melt layer thickness (from step 304) can be selected.

Figure 9:
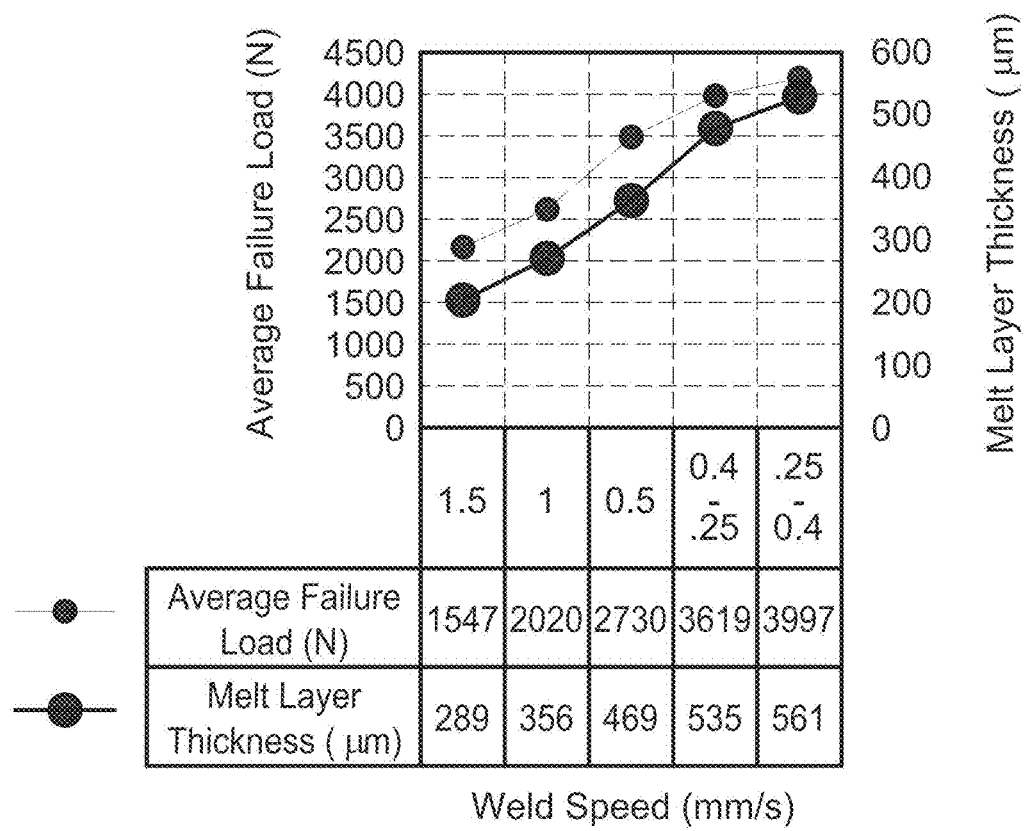
FIG. 9 is an exemplary graph showing a relationship between measured melt layer thicknesses and measured failure loads for a plurality of sample assemblies according to some implementations of the present disclosure.

In some implementations, step 306 can include generating a graph that plots the measured average failure load and the measured melt layer thickness (e.g., on a y-axis) versus the varied first weld process setting (e.g., on an x-axis). Referring to FIG. 9, an exemplary graph illustrating the relationship between melt layer thickness, failure load, and first weld process setting (weld velocity) for the examples shown in FIGS. 4-8 is illustrated. As shown, the measured average failure load and the measured melt layer thickness are linearly related to one another. That is, as the melt layer thickness increases, the average failure load (weld strength) increases. However, at some point as these values continue to increase, the average failure load approaches or becomes equal to the parent material strength of the sample assemblies (e.g., the material strength of the first part 110 and/or the second part 120 of assembly 100). At this point, any further increase in melt layer thickness will not impact the overall strength of the assembly given the limitations of the parent material strength. Thus, it is generally desirable to select the melt layer thickness whose associated failure load is equal to or very close (e.g., to within 1% or 5%) to the parent material strength.

For example, in the example of FIG. 9, the melt layer thickness (561 microns) of the fifth plurality of sample assemblies (FIG. 8) is selected because the associated average failure load (3997 N) is the greatest value on the graph. This result was created using the profiled weld velocity that linearly increases from 0.25 mm/s to 0.4 mm/s. A slower velocity during melt initiation and a faster velocity in the middle and end of the weld increases weld strength, shortens weld time, and reduces surface marking. In other words, a linearly increasing weld velocity profile causes generation of a larger, more consistent melt layer.

Alternatively, the predetermined weld strength used for selecting the melt layer thickness in step 306 can be a predetermined percentage of the parent material strength. For example, the predetermined percentage can be between about 50% and about 100% of the parent material strength (e.g., about 50% of the parent material strength, about 67% of the parent material strength, about 75% of the parent material strength, about 80% of the parent material strength, about 90% of the parent material strength, about 95% of the parent material strength, about 100% of the parent material strength, at least about 60% of the parent material strength, at least about 75% of the parent material strength, at least about 80% of the parent material strength, at least about 90% of the parent material strength, at least about 95% of the parent material strength, etc.)

Step 307 of the method 300 includes forming a production assembly using the welding process settings associated with the selected melt layer thickness from step 306. Unlike the sample assemblies described herein, a production assembly is a welded assembly that is produced (e.g., mass-produced) for consumers rather than for testing purposes (e.g., destructive testing). As described herein, various weld process settings can be adjusted (e.g., weld velocity, dynamic hold distance, dynamic hold velocity, etc.) such that the production assembly has a weld joint with a melt layer thickness that substantially the same as the selected melt layer thickness from step 306 (e.g., the melt layer thickness of the production assembly is within ±1%-5% of the selected melt layer thickness from step 306). As such, the production assembly will have the predetermined weld strength.

In some implementations, steps 301-305 of the method 300 can be repeated using the selected melt layer thickness from step 306 to vary another weld process setting. For example, if the value of the weld velocity is varied during step 302, the method 300 can be repeated one or more times to also vary additional weld setting parameters such as, for example, dynamic hold velocity and dynamic hold distance.

Figure 10:
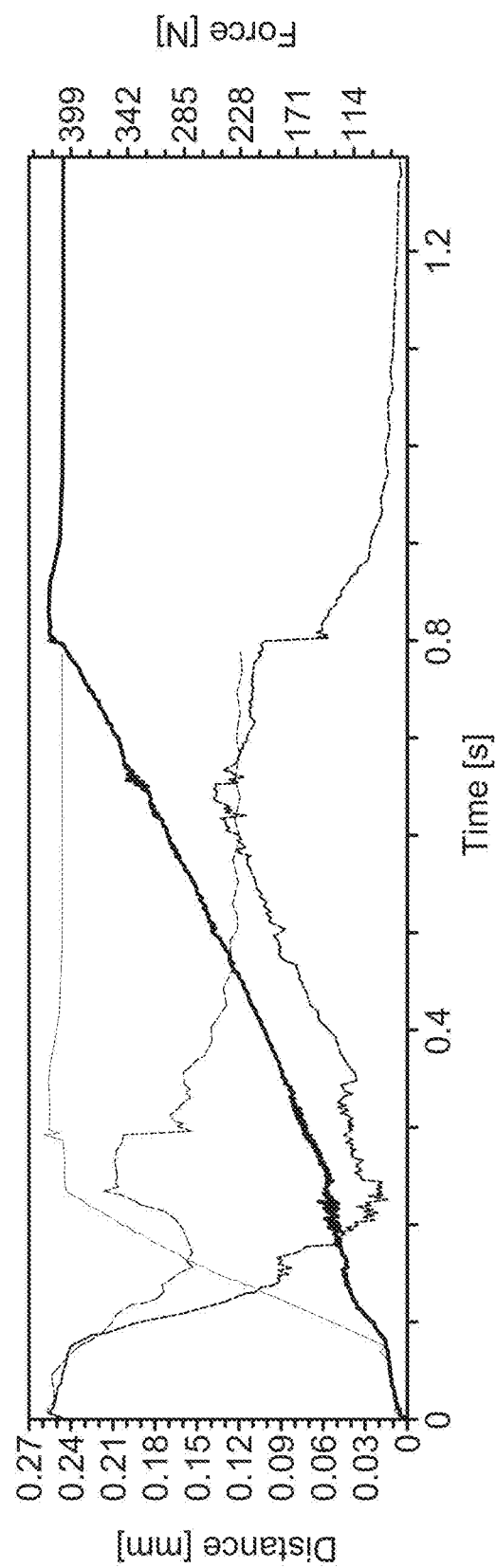
FIG. 10 is an exemplary graph showing force versus distance for a first weld velocity and a second weld velocity according to some implementations of the present disclosure.

Referring to FIG. 10, an exemplary graph is illustrated showing a relationship between force and distance (see y-axis) plotted against time (see x-axis). In the particular examples described herein, the profiled weld velocity between 0.25 mm/s and 0.4 mm/s produced the best results. As shown by the graph in FIG. 10, the application of moderate forces at the later stages of the process generated a steady linear displacement rate. A steady melt rate creates a homogenous molecular structure and stronger weld.

Referring to Table 3 below, the method 300 can be repeated using the weld velocity associated with the selected melt layer thickness from step 306 (in this example, 0.25 mm/s to 0.4 mm/s) while varying the dynamic hold distance weld process setting (e.g., between 25 microns and 175 microns) and/or the dynamic hold velocity weld process setting (e.g., between 1 mm/s and 3 mm/s). Step 305 can then be repeated to measure failure loads for each plurality of sample assemblies formed using the varied weld process settings.

TABLE 3

| Dynamic Hold Distance (μm) | 1 mm/s Dynamic Hold Velocity | | 3.0 mm/s Dynamic Hold Velocity | |
| --- | --- | --- | --- | --- |
| | Average Failure (N) | Failure Mode | Average Failure (N) | Failure Mode |
| 25 | 3122 | Part | 3522 | Part |
| 37.5 | 2734 | Part | 4069 | Part |
| 50 | 3108 | Part | 3510 | Part |
| 75 | 3165 | Part | 3554 | Part |
| 125 | 3394 | Part | 3544 | Part |
| 175 | 3495 | Part | 3114 | Part |

As shown in Table 3, all sample assemblies formed using the linearly profiled 0.25 mm/s to 0.4 mm/s weld velocity failed through the parent material regardless of the dynamic hold velocity value and/or the dynamic hold distance value.

Figure 11:
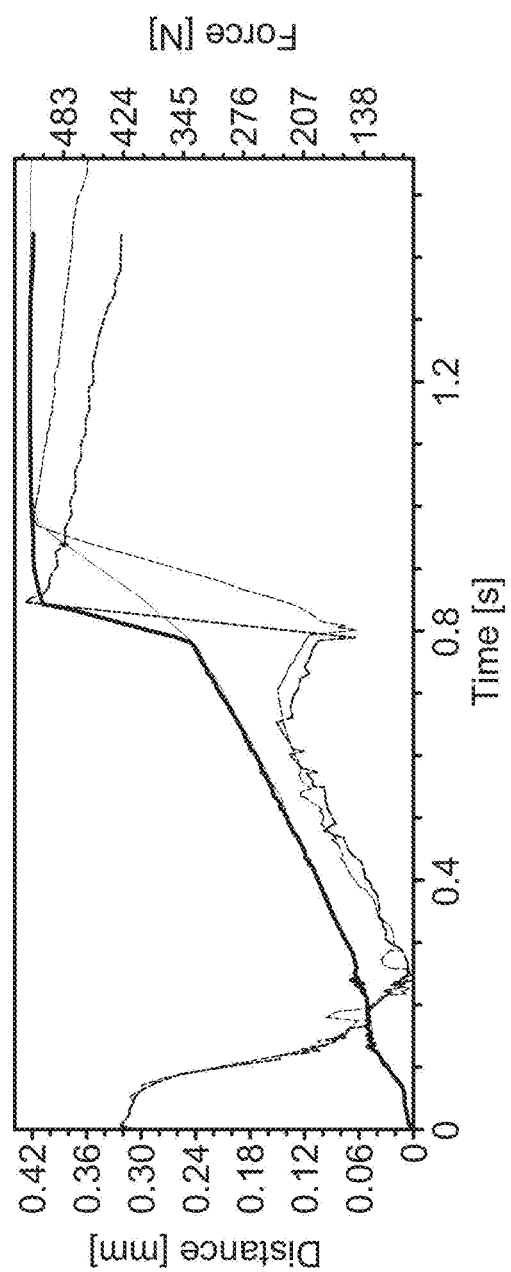
FIG. 11 is an exemplary graph showing force versus distance for a first dynamic hold distance and a first dynamic hold velocity and a second dynamic hold velocity according to some implementations of the present disclosure.
Figure 12:
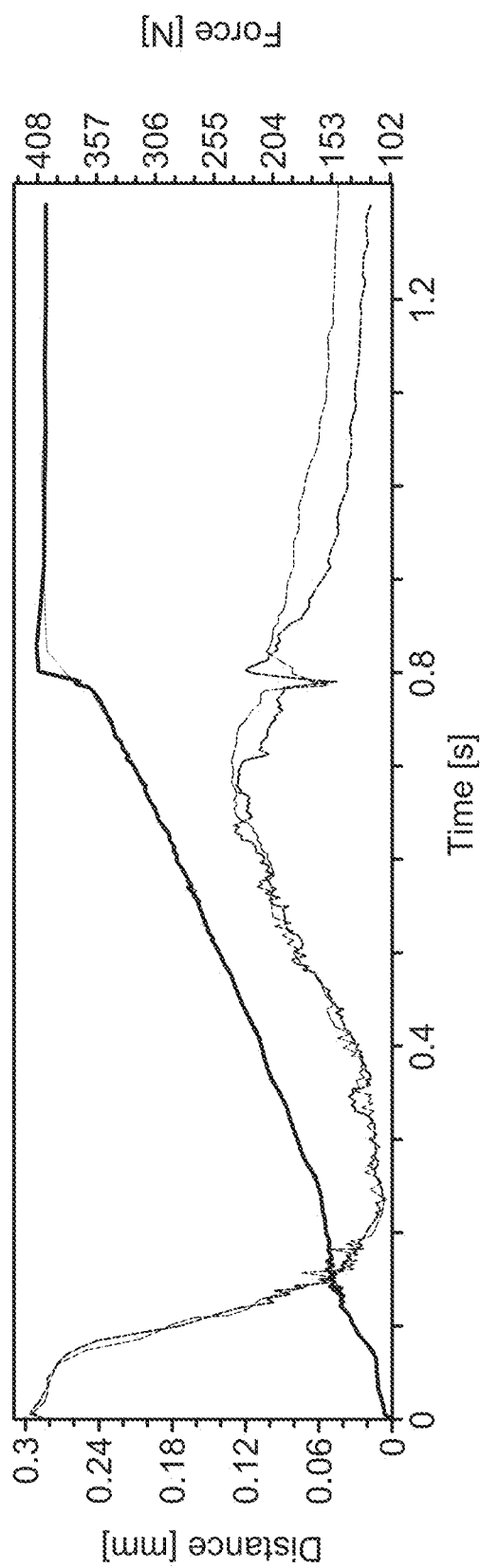
FIG. 12 is an exemplary graph showing force versus distance for a second dynamic hold distance and the first dynamic hold velocity and the second dynamic hold velocity of FIG. 11 according to some implementations of the present disclosure.

Referring to FIG. 11, an exemplary graph is illustrated showing force versus distance for a 0.175 mm dynamic hold distance, a 1 mm/s dynamic hold velocity, and a 3 mm/s dynamic hold velocity. Referring to FIG. 12, an exemplary graph is illustrated showing force versus distance for a 0.0375 mm (37.5 microns) dynamic hold distance, the 1 mm/s dynamic hold velocity, and the 3 mm/s dynamic hold velocity. The graphs in FIGS. 11 and 12 show that a weld formed with a 3 mm/s dynamic hold velocity had, in general, a steeper slope of the force/time curve during the dynamic hold cycle than a weld formed with a 1 mm/s dynamic hold velocity.

Figure 13:
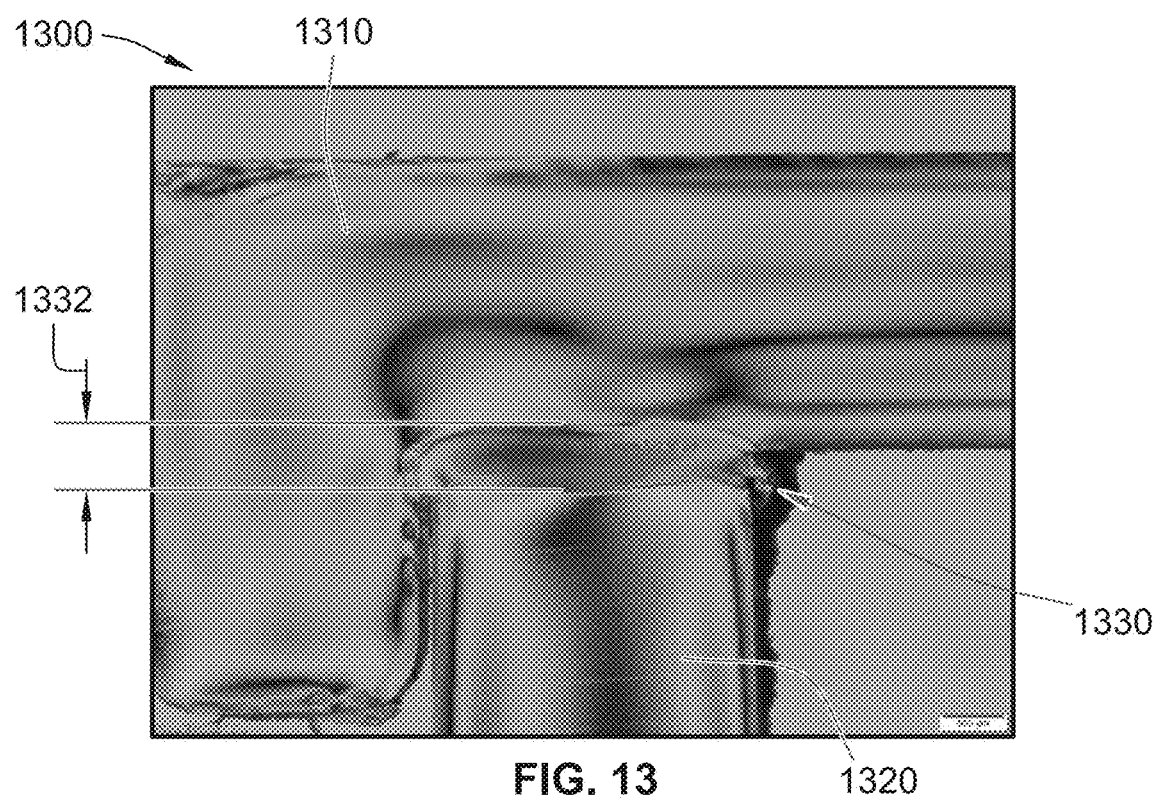
FIG. 13 is an exemplary cross-sectional image of a sixth weld joint of a sixth sample assembly according to some implementations of the present disclosure.

Referring to FIG. 13 an exemplary cross-sectional image of a sixth sample assembly 1300 including a first part 1310, a second part 1320, a weld joint 1330, and a melt layer thickness 1332 is shown. The sixth sample assembly 1330 of FIG. 13 was formed using a 37.5-micron dynamic hold distance and a 1 mm/s dynamic hold velocity.

Figure 14:
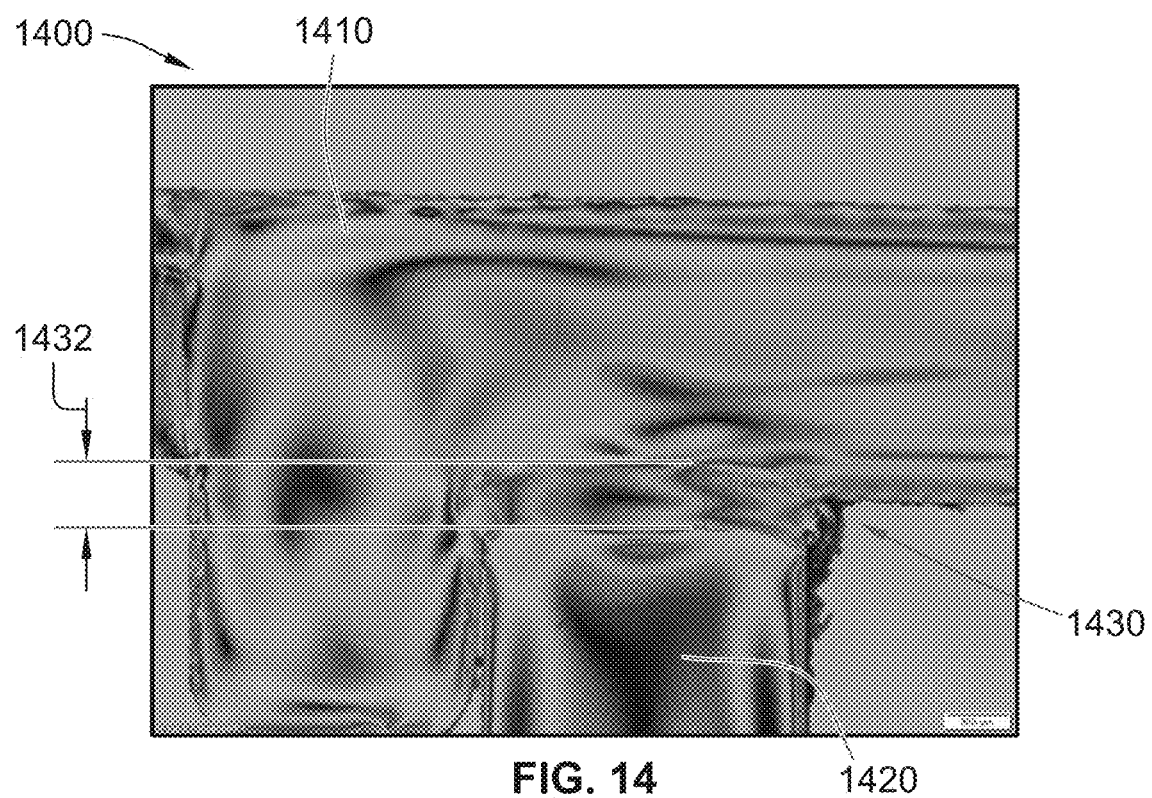
FIG. 14 is an exemplary cross-sectional image of a seventh weld joint of a seventh sample assembly according to some implementations of the present disclosure.

Referring to FIG. 14, an exemplary cross-sectional image of a seventh sample assembly 1400 including a first part 1410, a second part 1420, a weld joint 1430, and a melt layer thickness 1432 is shown. The seventh sample assembly 1430 of FIG. 14 was formed using a 75-micron dynamic hold distance and a 1 mm/s dynamic hold velocity.

Figure 15:
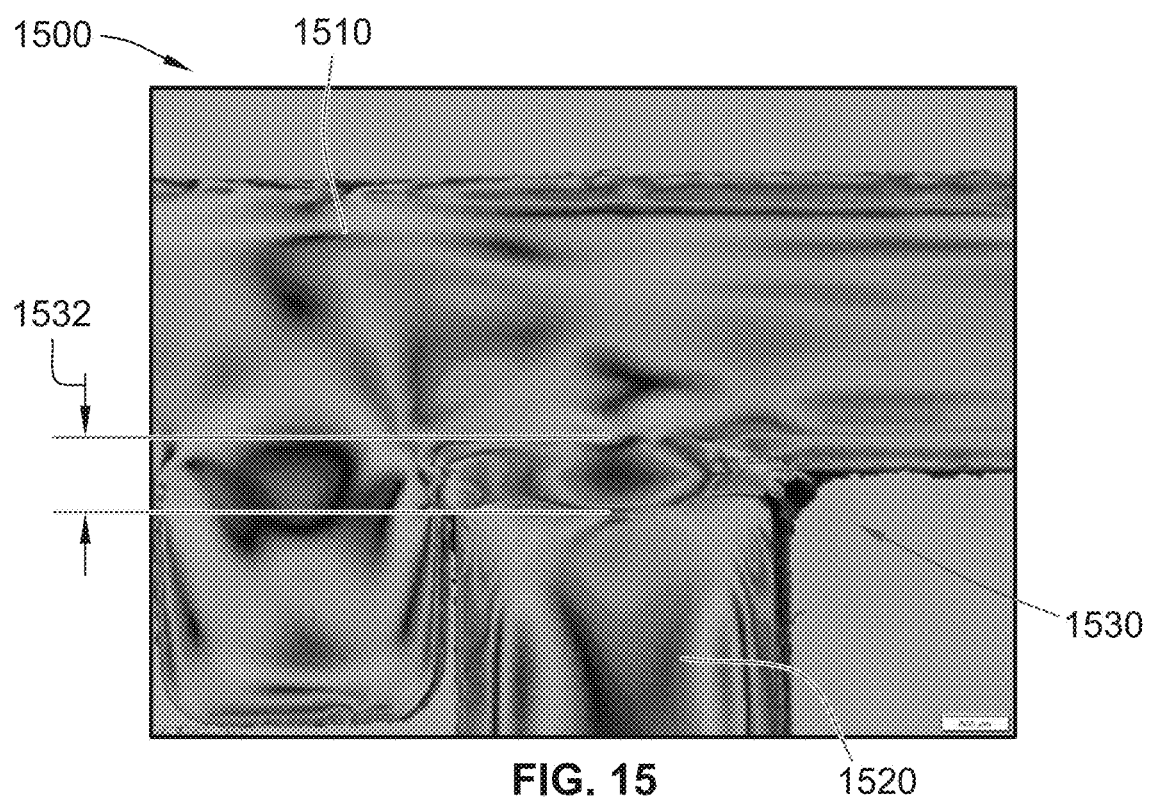
FIG. 15 is an exemplary cross-sectional image of an eight weld joint of an eighth sample assembly according to some implementations of the present disclosure.

Referring to FIG. 15, an exemplary cross-sectional image of an eighth sample assembly 1500 including a first part 1510, a second part 1520, a weld joint 1530, and a melt layer thickness 1532 is shown. The eighth sample assembly 1530 of FIG. 15 was formed using a 125-micron dynamic hold distance and a 1 mm/s dynamic hold velocity.

In some implementations, the method 300 can further include examining (e.g., using a microscope) cross-sections of sample assemblies (e.g., that are the same as, or similar to, FIGS. 13-15) formed using the varied dynamic hold distance and/or dynamic hold velocity. In the examples of FIGS. 13-15, the melt layer thickness remained unchanged after reaching a minimum dynamic hold distance of 37.5 microns regardless of increased dynamic hold distance values. As material solidifies, further increase in force required to gain additional weld collapse does not produce any added material displacement, but instead results in increased residual stress in the weld joint. These results (FIGS. 11-15) show that some material displacement occurs during the dynamic hold phase, resulting from moderate force application to the molten material is beneficial to weld strength and a small pull strength standard deviation. As material solidifies, a further increase in force to gain additional hold collapse does not produce any added material displacement and results in increased residual stress in the weld.

Associating a specific weld velocity profile and dynamic hold settings with formation of a homogeneous melt layer in the interface of the assembly can facilitate selection of optimum welding parameters. Because the thickness of the melt layer closely correlates with the strength of the weld join, the thickness of the melt layer is a major predictor of the resulting weld quality. The capabilities of servo-driven ultrasonic welding machines in controlling material flow during every stage of the welding cycle enable an operator to empirically establish a defined range of melt layer characteristics correlated to known weld strength. This allows the operator to reuse the best velocity profile and dynamic hold parameters to generate an optimum melt layer thickness for a given joint geometry. Considering high repeatability and accuracy of servo-driven ultrasonic welders, maintaining these settings in manufacturing process should result in anticipated melt layer thickness and joint strength. The methods described herein for selecting weld process settings and controlling the welding process offer users a more robust way to assure weld quality in manufacturing operations.

While the method 300 has been described herein as being used with a servo-controlled ultrasonic welding process, more generally, any of the methods disclosed herein can be used with any other welding process, such as, for example, a non-servo-controlled ultrasonic welding process, a pneumatically-driven ultrasonic welding process, a laser welding process, an infrared welding process, or a hot plate welding process.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A method for optimizing a servo-controlled ultrasonic welding process to produce a weld joint having a predetermined strength, the method comprising:
    measuring a plurality of melt layer thicknesses of weld joints for a plurality of sample assemblies formed by the servo-controlled ultrasonic welding process using one of a weld velocity or a dynamic hold velocity as a weld process setting;
    measuring a plurality of failure loads of weld joints for the plurality of sample assemblies, each of the measured plurality of failures loads being associated with one of the measured plurality of melt layer thicknesses;
    selecting a first failure load from the plurality of measured failure loads responsive to determining that the first failure load corresponds to a predetermined weld strength; and
    selecting a first melt layer thickness from the plurality of measured melt layer thicknesses that is associated with the selected first measured failure load.

2. The method of claim 1, further comprising welding together a first part and a second part to form a production assembly including a weld joint having the selected first melt layer thickness.

3. The method of claim 1, wherein the predetermined weld strength is between about 75% and about 100% of a parent material strength of the plurality of sample assemblies.

4. The method of claim 1, wherein the predetermined weld strength is at least 80% of a parent material strength of the plurality of sample assemblies.

5. The method of claim 1, wherein the predetermined weld strength is equal to a parent material strength of the plurality of sample assemblies.

6. The method of claim 1, wherein measuring the plurality of melt layer thicknesses includes cross-sectioning at least some of the plurality of sample assemblies.

7. The method of claim 1 wherein the measuring the plurality of failure loads includes applying a tensile strength test to at least some of the plurality of sample assemblies.

8. A method for producing welds having a predetermined weld strength, the method comprising:
    forming a first plurality of sample assemblies using a first value of a first weld process setting;
    forming a second plurality of sample assemblies using a second value of the first weld process setting value, the second value being different than the first value;
    measuring a first melt layer thickness of a weld joint of at least one the first plurality of sample assemblies and a second melt layer thickness of a weld joint of at least one of the second plurality of sample assemblies;
    measuring a first failure load of at least one the first plurality of sample assemblies and a second failure load of at least one of the second plurality of sample assemblies; and
    responsive to determining that the first failure load corresponds to a predetermined weld strength, forming a production assembly including a weld joint having a melt layer thickness that is substantially the same as the first melt layer thickness,
    wherein the first weld process setting is a weld velocity or a dynamic hold velocity.

9. The method of claim 8, wherein the first weld process setting is a dynamic hold distance.

10. The method of claim 8, wherein forming the first plurality of sample assemblies and forming the second plurality of sample assemblies includes maintaining a constant amplitude, a constant trigger force, a constant melt-detect percentage, a weld velocity, a constant static hold time, or any combination thereof.

11. The method of claim 8, wherein each of the first plurality of sample assemblies includes a first part and a second part and each of the second plurality of sample assemblies includes a first part and a second part.

12. The method of claim 11, wherein the predetermined weld strength is equal to or greater than a material strength of the first part of each of the first plurality of sample assemblies, a material strength of the second part of each of the first plurality of sample assemblies, the first part of each of the second plurality of sample assemblies, a material strength of the second part of each of the second plurality of sample assemblies, or any combination thereof.

13. The method of claim 8, wherein forming the first plurality of sample assemblies and forming the second plurality of sample assemblies includes using a servo-driven ultrasonic welding process.

14. The method of claim 8, further comprising:
forming a third plurality of sample assemblies using the first value of the first weld process setting and a first value of a second weld process setting;
forming a fourth plurality of sample assemblies using the first value of the first weld process setting and a second value of the second weld process setting;
measuring a third melt layer thickness of a weld joint of at least one of the third plurality of sample assemblies and a fourth melt layer thickness of a weld joint of at least one of the fourth plurality of sample assemblies; and
measuring residual stress in a weld joint of at least one of the third plurality of sample assemblies and in a weld joint of at least one of the fourth plurality of sample assemblies.

15. The method of claim 14, wherein the first weld process setting is a weld velocity and the second weld process setting is a dynamic hold distance.

16. A production assembly manufactured according to the method of claim 8.

* * * * *